United States Patent
Zernike

[11] 3,822,927
[45] July 9, 1974

[54] PHASE MATCHED OPTICAL WAVE GENERATOR FOR INTEGRATED OPTICAL CIRCUITS

[75] Inventor: Frits Zernike, Rowayton, Conn.

[73] Assignee: The Perkin-Elmer Corporation, Norwalk, Conn.

[22] Filed: Nov. 16, 1972

[21] Appl. No.: 307,065

[52] U.S. Cl............ 350/96 WG, 307/88.3, 350/157
[51] Int. Cl............................................... G02b 5/14
[58] Field of Search............... 350/96 WG; 307/88.3

[56] References Cited
UNITED STATES PATENTS

| | | | |
|---|---|---|---|
| 3,208,342 | 9/1965 | Nethercot............ | 360/96 WG UX |
| 3,537,020 | 10/1970 | Anderson............ | 350/96 WG UX |
| 3,586,872 | 6/1971 | Tien.......................... | 350/96 WG X |
| 3,624,406 | 11/1971 | Martin et al............ | 350/96 WG UX |

*Primary Examiner*—John K. Corbin
*Attorney, Agent, or Firm*—John K. Conant

[57] ABSTRACT

A phase matched optical wave generator is described wherein a harmonic optical wave is generated by the interaction of a fundamental optical wave with a non-linear polarizing material. The harmonic wave is coupled to a thin-film optical waveguide which is tuned to the wavelength of the harmonic optical wave. The separation of the fundamental and harmonic waves in different optical waveguides facilitates phase matching over the length of the interacting region to produce a harmonic of enhanced intensity. Several embodiments are shown and described.

12 Claims, 4 Drawing Figures

3,822,927

PHASE MATCHED OPTICAL WAVE GENERATOR FOR INTEGRATED OPTICAL CIRCUITS

FIELD OF THE INVENTION

This invention relates to integrated optics generally and more specifically to a thin-film optical waveguide structure for generating optical waves of different wavelengths from a coherent optical wave.

BACKGROUND OF THE INVENTION

A new field, known as integrated optics, for laser applications has been developed wherein conventional beam-mode optical arrangements are replaced with miniaturized wave-mode propagating structures. A miniaturized optical circuit, for instance, may utilize an optical transmission path in the form of a thin-film optical waveguide. The thin-film waveguide has dimensions of the order of wavelengths of the optical wave in order to propagate a particularly desired wave mode. A recent article entitled "A Survey of Integrated Optics" published in the IEEE Journal of Quantum Electronics, Vol. QE-8, No. 2, Feb., 1972 describes various developments in the integrated optics field.

Various forms of thin-film optical waveguides are known and commonly include strips of wave-mode sustaining glass surrounded by glass of a lower refractive index. The optical waveguide sustains an optical wave of a particular mode depending upon such physical characteristics as the guide dimensions. The optical waveguides may include various configurations to accomplish circuitry functions such as filters, modulators, mixers and the like.

In one known form of an integrated optical circuit such as described in U.S. Pat. No. 3,586,872 to Ping K. Tien, harmonics of a light wave are generated. The light wave propagates along an optical waveguide which overlies a so-called non-linear polarization material such as single crystal zinc sulfide (Zn S). A portion of the optical wave, known as the evanescent segment, travels in the non-linear polarization material and interacts to produce a higher frequency harmonic wave which propagates in the optical waveguide together with the original or fundamental optical wave.

The generation of the harmonic occurs over an extended or physically distributed distance along the waveguide. Since the harmonic is desired for signal processing or the like, care must be exercised to preserve as much of the harmonic as possible. When the fundamental optical wave and the harmonic travel with different propagation constants, phase differences occur along the interaction region. The difference in phase causes cancellations of the harmonic whose intensity is thus significantly reduced. It is, therefore, desired that the fundamental optical wave and the harmonic optical wave remain in phase with each other throughout the interaction region of the non-linear polarization material.

One condition under which such "phase matching" can be obtained with the structure shown in the above identified Tien patent is by propagating the fundamental wave and harmonic wave with modes of different order and, if necessary, also with different polarizations.

As shown with the curves of FIG. 1, the propagation constants of optical waves vary with the thickness of the optical waveguide and also with different modes. However, there are discrete waveguide thickness dimensions for which the propagation constant of different modes such as $TE_0$, curve 10, for the fundamental optical wave and $TM_2$, curve 12, for the harmonic are the same. With an optical waveguide having a thickness of $d_1$ as determined by the intersection 14 of curves 10 and 12, phase matching could be obtained.

One can see from FIG. 1 that curves 10 and 12 intersect one another with an appreciable angle $\alpha$. Hence, any variation of thickness of the optical waveguide introduces phase mismatches of significant amounts. This imposes an undesirably critical control over the thickness of the optical waveguide.

SUMMARY OF THE INVENTION

In an integrated optical circuit in accordance with the invention, a harmonic generator may be formed utilizing a non-linear polarization material and two closely spaced parallel waveguides. One waveguide is tuned for the fundamental of the optical wave and the other waveguide is tuned to the harmonic.

The two waveguides are separated by a thin layer of optical material having a lower index of refraction than the material of which the optical waveguides are made. Since each waveguide has to be resonant for only one mode the guide thickness tolerance is significantly relaxed and the optical circuit is more convenient to construct.

It is, therefore, an object of the invention to provide an integrated optical circuit for generating optical waves of different wavelength from an input wave with a more conveniently manufactured structure.

BRIEF DESCRIPTION OF DRAWINGS

These and other advantages and objects of the invention will be understood from the following description of several embodiments described in conjunction with the drawings wherein.

DETAILED DESCRIPTION OF EMBODIMENTS

Figure 1:
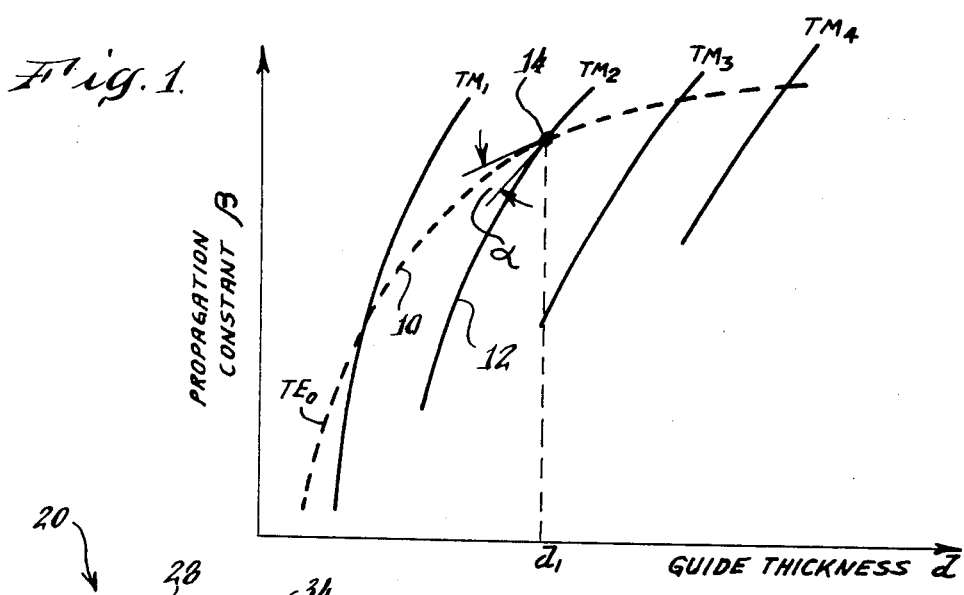
FIG. 1 is a plot of curves showing propagation velocities of different optical wave-modes in dielectric slab-shaped optical waveguides as a function of the thickness of waveguides.
Figure 2:
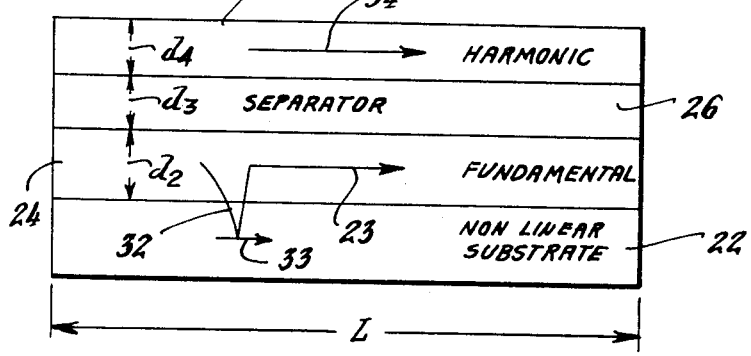
FIG. 2 is an enlarged schematic representation of a first embodiment of an optical circuit in accordance with the invention.

With reference to FIG. 2, an optical circuit 20 is shown formed of a substrate 22 having non-linear polarizing characteristics. Substrate 22 is a single crystal material and may be formed of a non-linear polarizing material such as gallium arsenide.

A first thin-film layer 24 of linear polarization glassy material is deposited on substrate 22 to form an optical waveguide tuned to propagate an input fundamental wave 23. Optical waveguide 24 is of the dielectric type bounded by a lower index dielectric medium and has only the dimension, $d$, sufficiently small to produce guiding of light. The thickness $d_2$ of layer 24 is selected so that a particularly desired optical wave-mode may propagate along waveguide 24. The thin-film waveguide 24 need not be a single crystal.

After deposit of thin-film waveguide 24, a second glassy separating layer 26 is deposited over fundamental waveguide 24. Separator layer 26 has a thickness $d_3$ of the order of a fraction of a wavelength of the fundamental optical wave 23, about one-fourth wavelength. Separator layer 26 further has an index of refraction which is slightly less, usually by several percent, than the index of refraction of fundamental waveguide 24.

A third layer 28 of linear polarization glassy material is then deposited over separator layer 26 to form a harmonic optical waveguide. The thickness $d_4$ of harmonic optical waveguide 26 is selected to propagate a desired harmonic wave-mode which will remain phase matched with the fundamental optical wave throughout the length, L, of the interaction region.

The fundamental wave as represented by arrow 23 may be launched in waveguide 24 with known techniques (not shown) such as the prism type coupler described in the Tien patent or with a grating coupler as described in the above identified "Survey of Integrated Optics" article. The wave 23 has an evanescent segment 32 which travels in the adjacent non-linear polarizing substrate 22.

The interaction of evanescent segment 32 with substrate 22 results in a second harmonic 33 within substrate 22. Since the only place where harmonic 33 is phasematched is in harmonic optical waveguide 28, a transfer of the second harmonic wave from substrate 22 to waveguide 28 occurs through fundamental waveguide 24 and separator layer 26 so that a second harmonic wave 34 is launched in optical waveguide 28. The harmonic 33 substrate 22 remains phasematched with harmonic wave 34 in optical waveguide 28. Hence, the separation of the harmonic optical wave 34 from fundamental wave 23 in waveguides 28 and 24 respectively, facilitates phasematching and removes the criticality in controlling waveguide thickness as required in prior art harmonic generators.

The fundamental waveguide 24 is preferably placed adjacent to the non-linear polarization substrate 22 to increase the intensity of the evanescent segment 32 for an enhanced conversion thereof to second harmonic 33.

Figure 3:
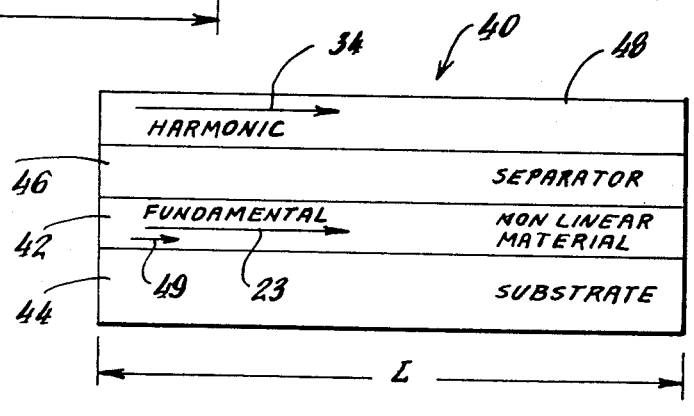
FIG. 3 is an enlarged schematic representation of a second embodiment of an optical cirrcuit in accordance with the invention.

FIG. 3 illustrates an alternate embodiment for a harmonic generator 40. In this embodiment, a fundamental optical waveguide 42 is deposited on a substrate 44. The substrate is formed of a linear polarization material with a lower index of refraction than fundamental optical waveguide 42.

Optical waveguide 42 is formed of a single crystal isotropic non-linear polarization material such as an epitaxial layer of gallium arsenide. The separator layer 46 and harmonic waveguide 48 are both formed of glassy linear polarization materials. Separator layer 46 has a slightly lower index of refraction than layers 44 and 48. The interaction of the fundamental wave 23 in the isotropic non-linear polarization single crystal optical waveguide 42 produces a second harmonic 49 which is coupled to harmonic waveguide 48 along the length, L, of the interaction region to form second harmonic wave 34.

In an alternate embodiment, the harmonic waveguide 48 may be formed of a single crystal isotropic non-linear polarization material such as gallium arsenide. The non-linear interaction for harmonic generation would be increased for a more efficient generation of the harmonic optical wave. In such case separator layer 42 can also be formed of a single crystal isotropic non-linear polarization material such as gallium phosphide. A sandwich structure can be grown on a substrate 44 of gallium phosphide to form a highly efficient interaction of optical circuit for harmonic wave generation.

The optical waveguide structures of FIGS. 2 and 3 have been described in conjunction with the generation of second harmonics. Other uses may be contemplated such as for sum and difference frequency generation or parametric frequency generation.

Figure 4:
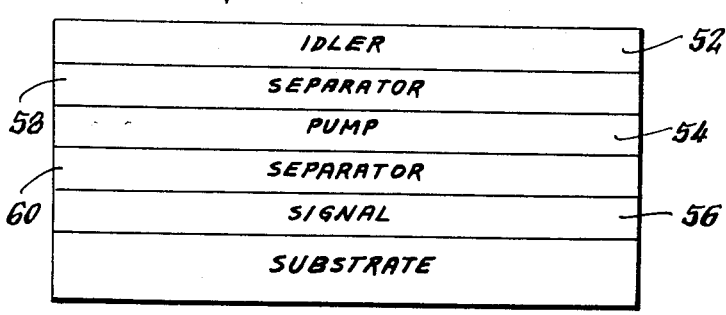
FIG. 4 is an enlarged schematic of a third embodiment of an optical circuit in accordance with the invention.

FIG. 4 shows an optical waveguide structure wherein three thin-film optical waveguides 52, 54 and 56 for respectively, the idler wave, pump wave and signal wave, are placed on top of each other and spaced with thin-film separator layers 58 and 60. The optical waveguides 52, 54, 56 may each be formed of non-linear polarization materials. The optical waveguides 52, 54 and 56 are tuned to resonance by selecting their thicknesses to respectively the frequencies for the idler wave, the pump wave and signal wave. Resonance tuning of the waveguide, however, may also be accomplished by using electro-optical effects.

Having thus described an optical circuit for generating optical waves of different wavelengths with the use of non-linear polarizing materials, the various advantages of the invention may be appreciated. Harmonic waves or parametric frequency generators may be constructed with a significantly relaxed constraint of optical waveguide dimensions to create optical waves of desired wavelengths and mode orders.

What is claimed is:

1. An integrated optical circuit for generating optical waves of different wavelengths comprising
   a first thin-film optical waveguide having a thickness selected to propagate a first optical wave;
   a second thin-film optical waveguide having a second thickness selected to propagate a second optical wave of a different wavelength;
   a separating thin-film layer of optical material interposed between the first and second thin-films, said separating thin-film layer having a lower index of refraction than said first and second thin films, said index of refraction being low enough so that only evanescent portions of the waves in the two waveguides propagate in the separating layer; and
   a layer of single crystal non-linear polarizing material located in interacting relationship with the first optical wave for an evanescent segment of the first optical wave interacting with said non-linear polarizing material to generate said second optical wave therein, said interacting layer being in close coupling relationship with the second thin-film optical waveguide through said separating layer to launch the second optical wave in said second waveguide.

2. The integrated optical circuit as claimed in claim 1 wherein the non-linear polarizing material is in the form of a single crystal non-linear polarizing substrate, with said first thin-film optical waveguide being deposited on the substrate to couple an evanescent segment of the first optical wave into the substrate for interaction therewith and generation of said second optical wave.

3. The integrated optical circuit as claimed in claim 2 wherein said substrate is formed of an isotropic non-linear polarization crystal.

4. The integrated optical circuit as claimed in claim 1 wherein said second optical waveguide is dimensioned for resonance with the second harmonic of the first optical wave.

5. The integrated optical circuit as claimed in claim 4 wherein said separator layer has a thickness of the order of a fraction of the wavelength of the first optical wave.

6. The integrated optical circuit as claimed in claim 1 wherein the first thin-film optical waveguide is formed of said layer of single crystal non-linear polarizing material for enhanced interaction between the first optical wave and the non-linear polarizing material.

7. The integrated optical circuit as claimed in claim 6 wherein said second thin-film optical waveguide is formed of said single crystal non-linear polarizing material.

8. The integrated optical circuit as claimed in claim 7 and further including a substrate on which the first optical waveguide is mounted, and with said separator layer and the substrate formed of a single crystal non-linear polarizing material having an index of refraction which is less than that of said first and second waveguides.

9. The integrated optical circuit as claimed in claim 8 wherein said first and second optical waveguides are formed of a first isotropic non-linear polarization material and wherein said thin-film separator and the substrate are formed of a second isotropic non-linear polarization material having a lower index of refraction than the first material.

10. An integrated optical circuit for generating different optical wavelengths from an input optical wave having a predetermined wavelength comprising
a thin-film optical waveguide structure formed of a plurality of optical waveguides respectively tuned to an optical wave of a desired wavelength, a non-linear polarizing material located in interacting relationship with one of said optical waveguides for generating an optical wave which is in resonance relationship with one of said optical waveguides, wherein said thin-film optical waveguide structure includes an idler optical wave sustaining waveguide, a pump optical wave sustaining waveguide and a signal optical wave sustaining waveguide, and thin-film separator layers located between said optical waveguides, said thin-film separators having a lower refractive index than said optical waveguides.

11. The integrated optical circuit as claimed in claim 10 wherein at least one of said thin-film optical waveguides is formed of said single crystal non-linear polarizing material.

12. The integrated optical circuit as claimed in claim 11 wherein one of said thin-film optical waveguides has a thickness selected to resonate with the second harmonic of an optical wave propagating in said thin-film waveguide formed of the single crystal non-linear polarizing material.

* * * * *